United States Patent [19]

Waygood

[11] 3,719,058
[45] March 6, 1973

[54] VEHICLE AIR CONDITIONING APPARATUS

[75] Inventor: James J. Waygood, Dallas, Tex.

[73] Assignee: Cummins Engine Company, Inc., Columbus, Ind.

[22] Filed: March 16, 1971

[21] Appl. No.: 124,860

[52] U.S. Cl. .................62/200, 62/243, 62/323
[51] Int. Cl. .................................F25b 5/00
[58] Field of Search........62/180, 181, 196, 199, 200, 62/216, 243, 244, 323

[56] References Cited

UNITED STATES PATENTS

| 2,336,733 | 12/1943 | Hull | 62/243 |
|---|---|---|---|
| 2,746,261 | 4/1956 | Gibson | 62/243 |
| 2,766,439 | 10/1956 | Palm | 62/323 |
| 2,895,308 | 7/1959 | Alward | 62/323 |
| 3,087,312 | 4/1963 | White | 62/323 |

Primary Examiner—Meyer Perlin
Attorney—Walter J. Jagmin

[57] ABSTRACT

An air conditioning apparatus having an auxiliary air conditioning apparatus mountable on a structure connectible to a vehicle, such as a camper mountable on the vehicle or a trailer towable by the vehicle, or mountable on a larger vehicle such as a motor home or van having a primary and a secondary space which are preferably cooled by separate means. The auxiliary apparatus has an evaporator, means for circulating air from the interior of such structure or the secondary space of the large vehicle through the evaporator and back into the interior or such secondary space, and a condenser through which air from the atmosphere is circulated to cool refrigerant fluid; and a primary air conditioning apparatus mountable on the vehicle which includes a compressor, a primary condenser and a primary evaporator, the two condensers being connected in a series to cool the refrigerant fluid compressed by the compressor and the evaporators being connected in parallel and so arranged that both will always be supplied with liquid refrigerant during operation of the apparatus. The apparatus also includes suitable control means for selectively operating the auxiliary and primary air conditioning apparatus for cooling the interior of the vehicle and such structure or the primary and secondary spaces of a large vehicle, which may be the space occupied by the driver of the large vehicle and a separate or connecting secondary space, and means for independently operating the primary air conditioning apparatus without the auxiliary apparatus being physically connected thereto.

11 Claims, 3 Drawing Figures

INVENTOR.
James J Waygood

INVENTOR.
James J Waygood

VEHICLE AIR CONDITIONING APPARATUS

This invention relates to air conditioning apparatus and more particularly to a vehicle air conditioning apparatus.

An object of this invention is to provide a new and improved air conditioning apparatus for cooling the interior or primary space of an engine driven vehicle and the interior of a structure connectible to such vehicle, such as a camper mountable on the vehicle or a trailer towable by the vehicle, or of a second compartment or secondary space of the vehicle.

Another object of this invention is to provide a new and improved air conditioning apparatus for cooling the interior of the vehicle or a primary space of the vehicle, such as a cab of a pickup truck or the primary space occupied by the driver of a motor home or van, and the interior of a camper mounted on such vehicle or of a trailer towable thereby, or of a secondary space of the vehicle.

Still another object is to provide an air conditioning apparatus for a vehicle and a structure connectible thereto having a primary apparatus mounted on the vehicle which includes an evaporator in which refrigerant fluid evaporates and expands to cool air being circulated therethrough, a compressor for compressing the evaporated refrigerant fluid and a condenser for cooling the compressed refrigerant fluid; and an auxiliary or secondary air conditioning apparatus mountable on the structure which has a second evaporator, an air moving means for circulating air from the interior of the structure to the evaporator and back to the interior, a second condenser through which air from the atmosphere is circulated; and means for connecting the two condensers in series and the two evaporators in parallel between the second condenser and the inlet of the compressor so that the compressed refrigerant fluid which has passed through both the condensers may flow to the inlet of the compressor through either or both of the evaporators.

Still another object is to provide an air conditioning apparatus of the type described having control means for selectively operating the vehicle and auxiliary air condition apparatuses.

A further object is to provide an air conditioning apparatus of the type described having sufficient liquid refrigerant therein to permit simultaneous operation of both the evaporators.

A still further object is to provide an apparatus of the type described having means for releasable connecting the auxiliary air conditioning apparatus to the vehicle air conditioning apparatus.

Additional objects and advantages of the invention will be readily apparent from the reading of the following description of a device constructed in accordance with the invention, and reference to the accompanying drawings thereof, wherein.

Figure 3:
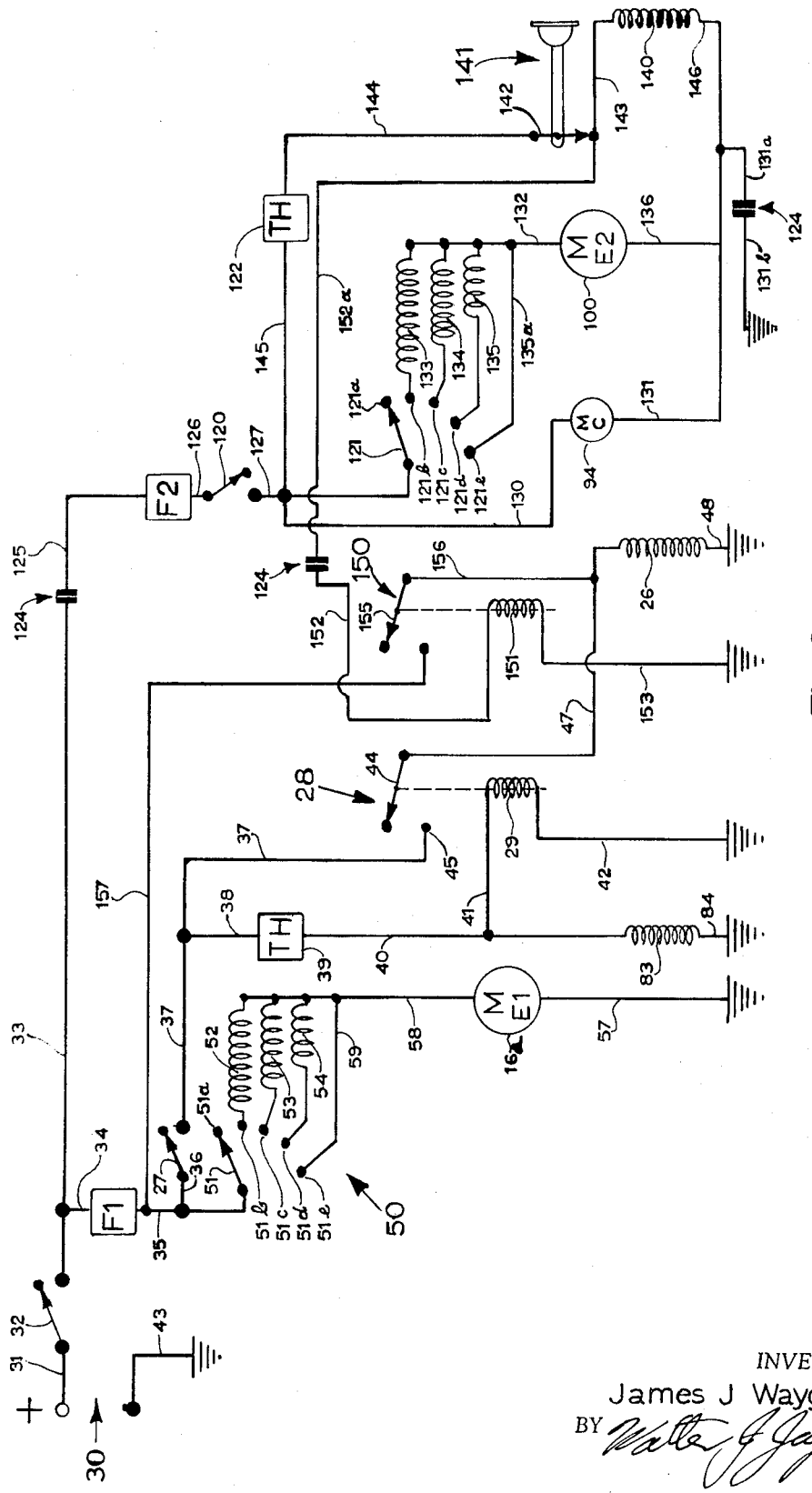

Referring now to the drawings, the air conditioning system embodying the invention is shown as installed to selectively cool the air in the cab of a pickup truck T and a camper C mounted thereon and includes an auxiliary air conditioning apparatus 10 mounted on the roof of the camper C and the usual or primary air conditioning apparatus 11 mounted in the truck which is normally used to cool the cab. The apparatus 11 may be a suitable commercially available type, as, for example, the apparatus Model No. 91-18079 and associated condenser and compressor available from Frigiking Division of Cummins Engine Company, Inc., Dallas, Tex. The air conditioning apparatus 11 includes the usual housing 12, mountable under the dashboard of the truck cab, having an evaporator 13 mounted therein and an air inlet opening 14 through which air is drawn from the truck cab into the interior of the housing, through the evaporator 13 and then back to the interior of the cab by means of a fan or blower 15a driven by an electric motor 16a (FIG. 3). The condenser 15 of the air conditioning apparatus 11 is mounted in the usual manner in front of the radiator 16 of the truck and its compressor 17 is connected to the drive shaft 18 of the truck engine which drives the fan 19 which draws air through the radiator 16 and condenser 15 by a suitable transmission, such as a pulley 20 mounted on the drive shaft 18, a belt 21 and a pulley 22 which is coupled by a suitable magnetic clutch 23 to the drive shaft of the compressor 17.

The magnetic clutch operates when its winding 26 (FIG. 3) is energized to establish a driving connection between the truck engine shaft 18 and the drive shaft of the compressor 17.

When the switch 27 of the apparatus 11 located in the cab of the truck is closed, the magnetic winding 26 of the magnetic clutch 23 is energized by means of a relay 28. When the switch 27 is closed, the relay winding 29 is connected across the input circuit 30 of direct current by the conductor 31 which is connected to the positive terminal of the input circuit, the ignition switch 32 of the automobile, or a suitable load carrying relay controlled by the ignition switch, the conductors 33 and 34, a fuse F1, the conductors 35 and 36, the switch 27, the conductors 37 and 38, the thermostat 39 when it is closed, the conductors 40, 41 and 42, ground and the conductor 43. When the relay winding 29 is energized, it causes its movable contact 44 to move to its closed position wherein it engages its stationary contact 45 thus causing the clutch winding 26 of the magnetic clutch 23 to be connected cross the input circuit by the conductor 31, the switch 32, the conductors 33 and 34, the fuse F1, the conductors 35 and 36, the switch 27, the conductors 37, the movable contact 44, the conductors 47 and 48, ground and the conductor 43.

It will thus be seen that the occupant or driver of the cab may start the operation of the compressor 17 by closing the switch 27 if the ignition switch 32 is also closed.

The motor 16a for operating the blower 15a which draws air through the evaporator 13 of the air conditioning apparatus 11 may be a multi-speed type motor and is connectible across the input circuit by a multi-position switch 50 whose movable contact 51 may engage any one of its stationary contacts 51a–51e, to connect anyone of the progressively smaller resistances 52, 53 and 54 in series with the motor or directly across the input circuit if the movable contact 51 engages the stationary contact 51e. One side of the motor 16a is connectible to the grounded side of the input circuit through the conductor 57, ground and the conductor 43 while its other side is connectible to the other, positive voltage, side of the input circuit through the conductor 58, one of the resistances or the conductor 59, as determined by the position of the movable contact 51, and the conductor 35, the fuse F1, the conductors 34 and 33, the switch 32 and the conductor 31.

The hot refrigerant fluid compressed by the compressor 17 is transmitted through the conduit 60 to the condenser 15. The cooled refrigerant fluid then flows through from the condenser 15 through a flexible conduit 61, a quick disconnect coupling 62 and a flexible conduit 63 to the upper end of the condenser 65 of the auxiliary apparatus 10 and is further cooled in passing therethrough. The cooled refrigerant fluid, normally in liquid state, flows from the condenser 65 through a conduit 66, a T-coupling 67, a conduit 68, a quick disconnect coupling 69 and a flexible conduit 70 to the usual receiver 71 of the refrigeration apparatus 11. The refrigerant fluid is supplied to the evaporator 13 from the receiver through a conduit 72, a normally closed solenoid valve 73, a conduit 74, a usual expansion valve 75 and a conduit 76. The expansion valve operation is controlled by a temperature bulb 77 which is mounted in heat exchange relationship with the outlet conduit 78 of the evaporator 13 and is connected to the evaporator expansion valve 75 by the conduit 79.

Operation of the solenoid valve 73 is also controlled by the thermostat 39, mounted in the cab or adjacent the inlet 14 of the housing 12, which controls the energization of the solenoid winding 83. The thermostat, of course, closes when the temperature within the cab rises above an adjustable value. The thermostat when it closes connects the solenoid winding 83 across the input circuit 30 through the conductor 31, the switch 32, the conductors 33 and 34, the fuse F1, the conductors 35 and 36, the switch 27, the conductors 37, 38, 40 and 84, ground and the conductor 43. It will thus be apparent that when an occupant of the cab of the truck T desires that the air conditioning apparatus 11 be operative, he sets the thermostat 82 to maintain a desired temperature in the cab, and, assuming that the switch 32 and the thermostat 39 are closed, closes the switch 27 which causes energization of the relay winding 29 causing the contact 44 to move to its closed position and thus causes the magnetic clutch winding 26 to be energized. The compressor will then operate. Such closure of the switch 27 will of course also cause energization of the solenoid winding 83 and therefore opening of the solenoid valve 73. The operator also, of course, sets the movable contact 51 of the switch in engagement with any one of its stationary contacts 51b–51e to cause the motor 16 to operate at any one of a plurality of pre-determined speeds and air will then be circulated from the cab, through the aperture 14 into the housing 12 near which the solenoid valve 73 and the expansion valve 75 are mounted, through the evaporator 13, through which the refrigerant fluid is flowing and evaporating, and back to the compartment through a suitable grill or air flow directing means of the blower or fan 15a. If the temperature drops below the value at which the thermostat is set, the thermostat opens to de-energize the relay winding 29, and therefore the clutch winding 26, to arrest operation of the compressor and also to de-energize the solenoid winding 83 and thus close the valve 73. Air continues to be circulated by the blower 15a since the motor 16a is still energized even though flow of the refrigerant fluid to the evaporator is arrested. When the temperature of the air being circulated from the cab rises above such value, the thermostat again closes to energize the solenoid winding 83 and cause the valve 73 to open and to again energize the clutch winding 26 and place the compressor in operation.

The auxiliary air conditioning apparatus 10 may be substantially of the type commercially available from Frigiking Division of Cummins Engine Company, Inc., Dallas, Tex., as Model No. TC 550 or TC 660 and includes a housing 88 mountable on the roof of the camper C to whose forward compartment 89 opens an aperture 90 behind which is mounted the condenser 65 and an upwardly opening outlet 92 through which air is moved from the forward compartment by a fan or blower 93 driven by an electric motor 94, The housing also has a rear compartment 95 having an inlet 96 opening through a suitable opening in the roof of the camper to the interior of the camper C and an evaporator 97 mounted in the rear compartment between the inlet 96 and an outlet 98 which also opens to the interior of the camper through a suitable aperture in the roof of the camper. Air is drawn into the rear compartment through the evaporator and back into the camper by an air moving means such as a fan 99 driven by an electric motor 100 also mounted in the rear compartment.

The auxiliary system can also be a separate condenser and fan assembly similar to the commercially available Frigiking Model No. 44-27057, and an evaporator and fan assembly similar to Frigiking Model No. 91-14333, properly connected as described herein.

Liquid refrigerant fluid is supplied to the lower end of the evaporator 97 through the conduit 66, the T-coupling 67, a conduit 102, which extends through a suitable aperture of the housing partition 103 which divides the housing into the two compartments, a solenoid valve 106, a conduit 107, an expansion valve 108 and a conduit 109.

Operation of the expansion valve is controlled by a temperature or expansion bulb 111, connected to the valve by a conduit 108, the bulb being disposed in heat exchange relationship with the metal outlet conduit 114 of the evaporator 114. The warmed refrigerant fluid in substantially gaseous state is returned to the inlet of the compressor through the outlet conduit 114, a connector 115 which connects the conduit 114 to one end of a flexible conduit 116, a quick disconnect coupling 117, a flexible conduit 118, a T-coupling 119 and a conduit 120. The outlet conduit 78 of the evaporator 13 of the apparatus 11 is also connected to the T-coupling 119.

Figure 1:
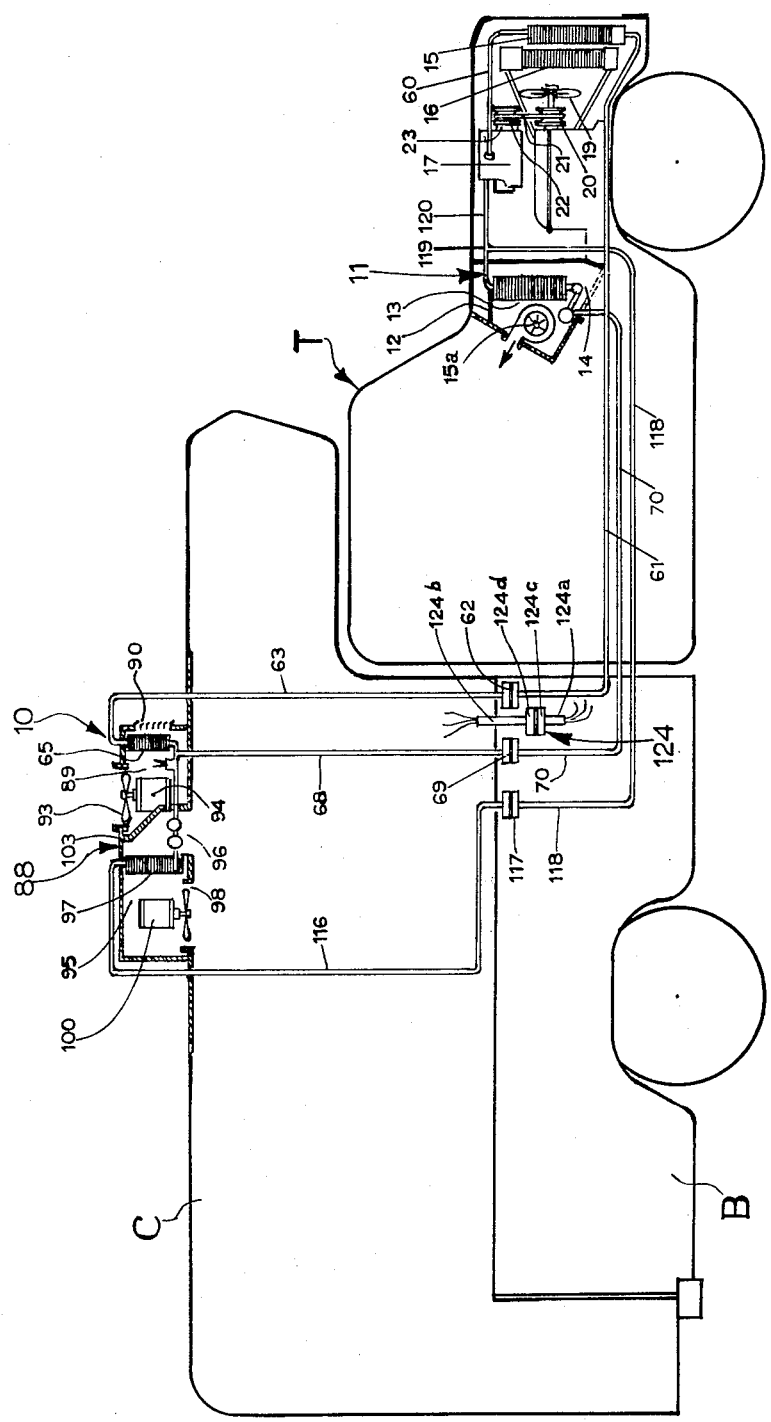
FIG. 1 is a schematic partly sectional view showing a pickup truck having a camper mounted thereon, the truck and the camper being provided with the air conditioning apparatus embodying the invention.
Figure 2:
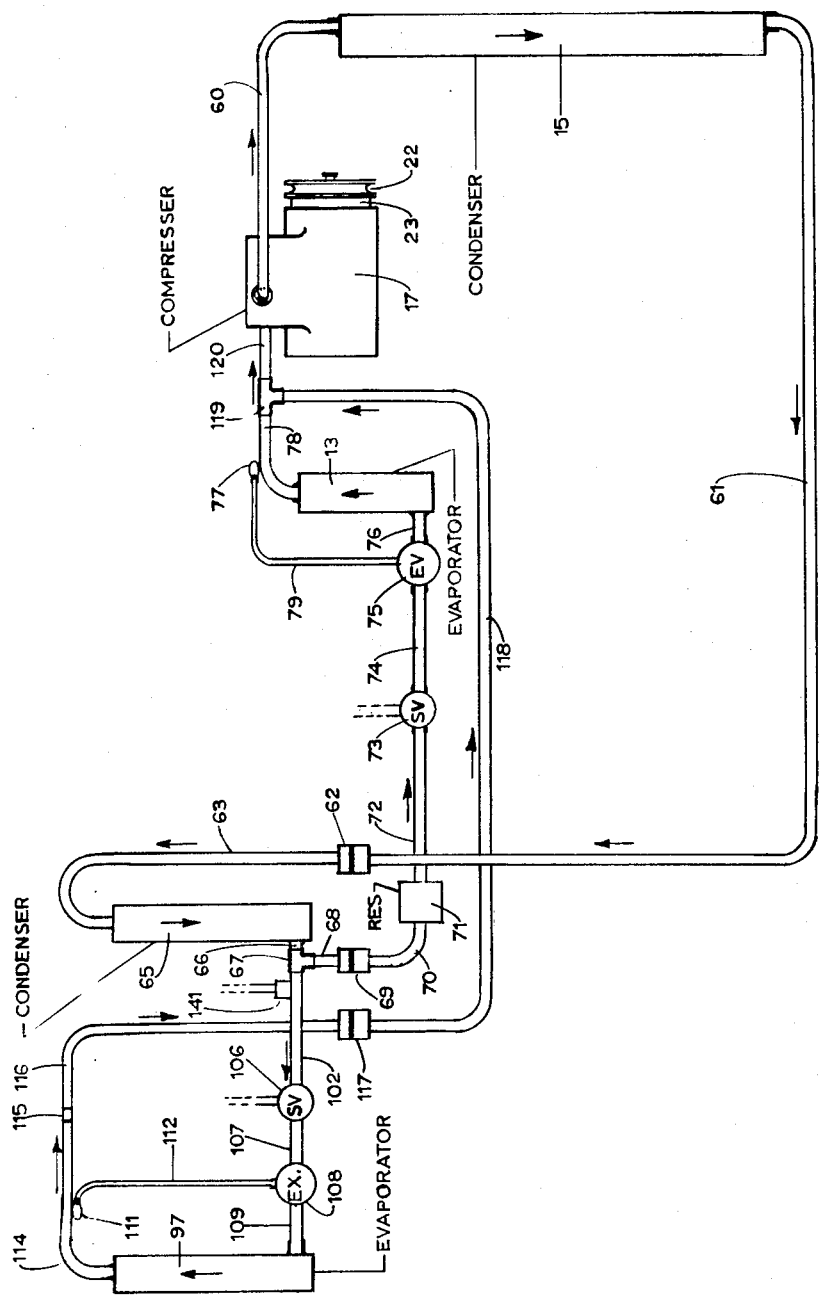
FIG. 2 is a schematic illustration of the refrigerant fluid circulation circuit of the air conditioning apparatus; and, FIG. 3 is a diagrammatic illustration of the control circuit of the air conditioning apparatus.

Operation of the auxiliary air conditioning apparatus 10 is controlled by manually operated switches 120 and 121 and a thermostat 122 which are located within the camper for operation whenever the switch 120 is closed, if the switch 32 is closed, being then connected to the conductor 33 by a conductor 125, a suitable coupling or connector 124, FIG. 1, a fuse F2, a conductor 126, the switch 120, the conductors 127, 130, 131, 131a, the connector 124 which connects the conductor 131a to a conductor 131b which is grounded to the truck, and the conductor 43.

Operation of the motor 100 for circulating air from the interior of the cab through the evaporator 97 and back into the compartment is controlled by the switch 121, one side of the motor being connectible to the conductor 127 by a conductor 132 and a selected one of the resistances 133, 134 and 135 and a conductor 135a, which are connected to the stationary contacts 121b–121e, respectively, of the switch 121, dependent on which of the stationary contacts is engaged by the switch 121. The opposite side of the motor 100 is connected to the other side of the input circuit being connected to the conductor 131a by the conductors 136 and 131.

The operation of the solenoid winding 140 of the solenoid valve 106 is controlled by the thermostat 122 and a temperature sensitive switch 141 which is connected in heat exchange relationship to the conduit 102, the movable contact 142 of the switch moving to open position when the temperature of the refrigerant fluid at the outlet of the condenser 65 is above a predetermined value. One side of the winding 140 of the solenoid valve 106 is connected to the conductor 127 through the conductor 143, the movable contact 142 of the temperature sensitive switch 141, a conductor 145, the thermostate 122, and the conductor 145 and its other side is connected to the conductor 131a by the conductors 146 and 131.

Closure of the switch 120 by an occupant of the camper C, when the thermostat 122 is closed, also causes energization of the winding 26 of the magnetic clutch 23 due to the operation of a relay 150 since one side of the relay winding 151 is connected to the conductor 127 by a conductor 152 which extends to the coupling or connector 124, the connector 124, the conductor 152a, the switch 142, the conductor 144, the thermostat 122 and the conductor 145 and its other side is connected to ground through the conductor 153. The relay winding 151 when energized moves its contact 155 to closed position thus connecting one side of the magnetic clutch winding 26 to the positive side of the input circuit through the conductors 47, 156, 157 and 35, the fuse F1, the conductors 34 and 33, the ignition switch 32 and the conductor 31, the other side of the winding 26 of course always being connected to the grounded side of the input circuit by the conductor 48, ground and the conductor 43.

In use, as shown schematically in FIG. 1, the auxiliary air conditioning apparatus 10 is mounted on the roof of the camper in any suitable manner and its flexible conduits 62, 68 and 116 extend outwardly of the housing 88 through suitable outlet apertures thereof and are provided at their free ends with one section of the quick disconnect couplings 117, 69 and 62, respectively, the other sections of these couplings being connected to the flexible conduits 61, 70 and 118, respectively.

The quick disconnect couplings may be of the type commercially available from Wiggins, Inc. of Los Angeles, Cal., as Model No. RF 265K4V10 for the male sections thereof and Model No. RF 260FP10b for the female sections which are connected to the conduits 61, 70 and 118 and which have check valves therein which close automatically when the male sections, connected to the conduits 63, 68 and 116, are disconnected therefrom.

The electrical conductors 33, 152 and 131b are conductors of a multi-conductor cable 124a connected to one section 124c of the coupling or connector 124 and similarly, the conductors 125, 152a and 131a are connected to the other detachable section 124d of the electrical connector 124, one of the connector sections having a plurality of prongs and the other having a plurality of sockets in which the prongs are received in the normal manner.

In order to insure proper operation of the system and provide sufficient refrigerant fluid in cooled condition for simultaneous flow through both evaporators, the refrigerant fluid circulation system is filled with refrigerant fluid in liquid state to substantially the output point of the condenser 65 or at least to the T-coupling 67. The air conditioning system employing both the usual air conditioning apparatus 11 and the auxiliary apparatus 10 then will have sufficient refrigerant in liquid condition for flow to either evaporator or to both evaporators simultaneously.

In use, the camper C is mounted on the truck, the flexible conduits are connected to the truck and the camper at suitable locations so that the quick disconnect couplings 62, 69 and 117, and the electrical coupling 124 may be at readily accessible locations. When the camper C is mounted on the bed of the pickup trailer, the conduits 63, 68 and 116 are connected to the flexible conduits 61, 70 and 118, respectively, by the couplings 62, 69 and 117, respectively, and the conductors 125, 152 and 131a are connected to the conductors 33, 152a and 131b, respectively by the connector 124. The conductors 43 and 131b are grounded to the truck body and thus to the grounded side of the input circuit 30.

If the motor of the engine of the truck is running, which means that the switch 32 is necessarily closed, an occupant of the cab of the truck T and an occupant of the camper C may operate the apparatuses 11 and 10, respectively, by operation of the switches 27 and 120 and each may select the temperature at which the interior of the cab or of the camper is to be maintained by appropriately setting the thermostats 82 and 122, respectively, and the rate of circulation of the air can of course be adjusted by the means of the multi-step switches 51 and 121, respectively. The magnetic clutch winding 26 will be energized whenever either of the switches 27 or 120 is closed, when their associated thermostats 39 and 122 are also closed, so that the compresser will be placed in operation at the discretion of the occupant of either the truck or of the camper mounted thereon. The condenser motor 94 of the auxiliary apparatus 10 will now operate continuously thus moving air through the condenser 65 at all times. If the truck is in forward motion, the rate of flow of air through the condenser 65 is increased.

It will be apparent that the additional condenser 65 connected in series with the condenser 15 aids in cooling the compressed refrigerant fluid so that the usual compressor 17 of the vehicle air conditioning apparatus will operate satisfactorily with both the interior of the cab and of the camper being cooled simultaneously without excessive loads being imposed on the compressor.

It will further be seen that the efficiency of operation of the vehicle air conditioning apparatus 11 will be increased if the auxiliary air conditioning apparatus 10 is not in operation since the condenser 65 provides additional cooling for the refrigerant fluid allowing the compressor to operate at lower lead pressures than would be the case if only condenser 15 were in operation. As can be seen, as the vehicle moves forward air passes through the condenser 65 even though the motor 94 is not in operation.

It will be apparent that even if the vehicle is standing still and the motor 94 is not operating, a certain amount of heat will be dissipated from the refrigerant fluid as it flows through the condenser 65 by radiation, conduction to the air and convection.

Should the liquid refrigerant flowing from the outlet of the condenser 65 rise above a predetermined temperature, which would indicate that the pressure of the refrigerant fluid in its circulating circuit has risen above a predetermined value, the solenoid 106 will be de-energized due to the action of the temperature sensitive switch 141 to prevent overheating of the system and its possible malfunction.

It will be apparent that such overheating is more apt to occur if the vehicle air conditioning apparatus 11 and the auxiliary air conditioning apparatus 10 are in simultaneous operation and therefore the auxiliary air conditioning apparatus is provided with this safety means. If desired, the vehicle air conditioning apparatus 11 may be provided with a similar temperature sensitive switch for de-energizing its solenoid valve 73 upon the occurrence of excessive temperatures in the refrigerant fluid circulation system.

It will further be seen that while the air conditioning apparatus has been illustrated and described as in use with a pickup truck having a camper C mounted thereon, the system could be used to cool a towing vehicle and a towed vehicle, such as a trailer, or different compartments or spaces of a relatively large vehicle such as a motor home or van which may have a front driver space and a rear living or cargo space.

It will further be seen that if it is desired to disconnect the camper C from the truck T, the three conduits 63, 69 and 116 are easily disconnected from the conduits 61, 70 and 118, respectively, and that the two sections 124c and 124d of the electrical connector 124 are also disconnected. The vehicle air conditioning apparatus 11 could then be easily placed in operation by first closing the open end of the conduit 118 at the lower section of its quick disconnect coupling 117 and connecting the two sections of the quick disconnect couplings 62 and 69 connected to the conduits 61 and 70 to one another by a suitable short connector conduit having similar quick disconnect coupling sections as are connected to the conduits 63 and 68. The vehicle air conditioning apparatus could then operate in the usual manner and could then be reconnected to the auxiliary air conditioning apparatus the next time such camper or trailer was again connected to the truck or towing vehicle.

It will now be seen that a new and improved air conditioning apparatus or system has been illustrated and described having an auxiliary air conditioning apparatus for cooling the interior of a structure connectible with a vehicle, such as the interior of a camper mounted on a truck vehicle or a trailer being towed by the vehicle, or a second compartment or space of a motor home or van, and that such auxiliary air conditioning apparatus includes a condenser connected in series with the condenser of the vehicle air conditioning apparatus, an evaporator connectible in parallel with the evaporator of the vehicle air conditioning apparatus and means for selectively operating the auxiliary and vehicle air conditioning apparatus.

It will further be seen that the control means includes means for causing operation of the compressor of the vehicle air conditioning apparatus even if the vehicle air conditioning apparatus is not being used to cool and circulate air through the interior or primary vehicle passenger compartment of the vehicle.

It will further be seen that the auxiliary air conditioning apparatus is very quickly and simply connectible and disconnectible from the vehicle air conditioning apparatus.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An air conditioning apparatus for cooling both a primary space of an engine driven vehicle and a second space of a space means associated with the vehicle said apparatus including: a vehicle air conditioning apparatus mountable on the vehicle and comprising a compressor, first means for connecting said compressor to the vehicle engine whereby said compressor is driven by the vehicle engine when the vehicle engine is in operation, a condenser connected to an outlet of said compressor for cooling refrigerant fluid compressed by said compressor, a first evaporator connected between said condenser and an inlet of said compressor through which the cooled refrigerant fluid from the condenser passes and evaporates in passing therethrough, second means for controlling flow of the refrigerant fluid from the condenser to the evaporator, first air moving means for circulating air through the evaporator and into the primary space of the vehicle, and first control means operatively associated with said first and second means for selectively causing operation of said first and second means; and an auxiliary air conditioning apparatus mountable on the space means and comprising a second evaporator, a second air moving means for moving air through said evaporator to said second space means, a second condenser conduit means for connecting said second condenser and the inlet of said compressor; third means for controlling flow of the refrigerant fluid from said second condenser to said second evaporator; and second control means operatively associated with said first means and said third means.

2. The air conditioning apparatus of claim 1, and third air moving means for moving air from the atmosphere through said second condenser and back to the atmosphere, said conduit means including means for connecting said second condensers in series with said first mentioned condenser and the inlet of said compressor.

3. The air conditioning apparatus of claim 2, wherein said second condenser and said second evaporator are spaced from said first mentioned condenser and said first evaporator, and refrigerant fluid in liquid state filling said conduit means substantially to the outlet of said second condenser.

4. The air conditioning apparatus of claim 3, wherein said first control means is operable by an occupant of said vehicle and said second control means is operable by an occupant of said space means.

5. The air conditioning apparatus of claim 4, wherein said conduit means comprises a first conduit for connecting the outlet of said first mentioned condenser to the inlet of said second condenser, a second conduit for connecting the outlet of said second evaporator to the inlet of said compressor, and a third conduit for connecting the outlet of said second condenser to the inlet of said first evaporator, said first, second and third conduits extending from said vehicle air conditioning apparatus to said auxiliary air conditioning apparatus.

6. The air conditioning apparatus of claim 5, wherein each of said first, second an third conduits has two sections, one connected to said vehicle air conditioning apparatus and the other to said auxiliary air conditioning apparatus, and means for releasably connecting said sections of said conduits to one another.

7. The apparatus of claim 6, wherein said first means comprises an electrically operable clutch having a winding, and said first and second control means each includes means for connecting said clutch winding across an input circuit of electric current.

8. The apparatus of claim 7, wherein said one section of said first conduit is connectible to said one section of said third conduit and said one section of said second conduit has closure means and is closable whereby said vehicle air conditioning apparatus may be operated independently of said auxiliary air conditioning apparatus.

9. The apparatus of claim 8, wherein said space means comprises a structure connectible to said vehicle.

10. The apparatus of claim 3, wherein said conduit means comprises a first conduit for connecting the outlet of said first mentioned condenser to the inlet of said second condenser, a second conduit for connecting the outlet of said second evaporator to the inlet of said compressor, and a third conduit for connecting the outlet of said second condenser to the inlet of said first evaporator, said first, second and third conduits extending from said vehicle air conditioning apparatus to said auxiliary air conditioning apparatus.

11. The apparatus of claim 10, wherein each of said first, second and third conduits has two sections, one connected to said vehicle air conditioning apparatus and the other to said auxiliary air conditioning apparatus, and means for releasably connecting said sections of said conduits to one another.

* * * * *